(12) United States Patent
Passalaqua

(10) Patent No.: US 7,015,480 B2
(45) Date of Patent: Mar. 21, 2006

(54) METHOD AND SYSTEM FOR CREATING AN IMAGE OF A RADIATION SOURCE

(76) Inventor: Anthony M. Passalaqua, 38 Warrensburg Cir., Hudson, OH (US) 44236

(*) Notice: Subject to any disclaimer, the term of this patent is extended or adjusted under 35 U.S.C. 154(b) by 147 days.

(21) Appl. No.: 10/802,465

(22) Filed: Mar. 17, 2004

(65) Prior Publication Data

US 2004/0183027 A1 Sep. 23, 2004

Related U.S. Application Data

(60) Provisional application No. 60/455,270, filed on Mar. 17, 2003.

(51) Int. Cl.
*G01T 1/00* (2006.01)

(52) U.S. Cl. .................... 250/393; 250/363.1
(58) Field of Classification Search ............. 250/393, 250/363.06, 363.07, 363.08, 363.09, 363.01, 250/363.1; 378/145, 146, 147, 148, 149
See application file for complete search history.

(56) References Cited

U.S. PATENT DOCUMENTS

| | | | | |
|---|---|---|---|---|
| 3,585,387 A | | 6/1971 | Bramlet | |
| 4,433,427 A | * | 2/1984 | Barnea | 378/146 |
| 4,688,242 A | | 8/1987 | Ema | |
| 4,761,802 A | * | 8/1988 | Kiri | 378/98.4 |
| 5,021,667 A | * | 6/1991 | Genna et al. | 250/363.1 |
| 5,847,398 A | * | 12/1998 | Shahar et al. | 250/370.09 |
| 6,091,070 A | * | 7/2000 | Lingren et al. | 250/370.09 |
| 6,272,207 B1 | * | 8/2001 | Tang | 378/149 |
| 6,353,227 B1 | | 3/2002 | Boxen | |
| 2002/0145114 A1 | * | 10/2002 | Inoue et al. | 250/363.06 |
| 2004/0000630 A1 | * | 1/2004 | Spartiotis et al. | 250/208.1 |

* cited by examiner

*Primary Examiner*—David Porta
*Assistant Examiner*—Faye Polyzos
(74) *Attorney, Agent, or Firm*—Tarolli, Sundheim, Covell & Tummino L.L.P.

(57) ABSTRACT

A method of creating an image of a radiation source includes detecting radiation associated with a first location of the radiation source. Data corresponding to the radiation associated with the first location is processed to provide a first value. The first value is employed to generate a first portion of the image associated with the first location. Radiation associated with a second location of the radiation source is detected. Data corresponding to the radiation associated with second location is processed to provide a second value. The second value is employed to generate a second portion of the image associated with the second location.

22 Claims, 3 Drawing Sheets

METHOD AND SYSTEM FOR CREATING AN IMAGE OF A RADIATION SOURCE

RELATED APPLICATION

This application is related to U.S. Provisional Patent Application Ser. No. 60/455,270, filed Mar. 17, 2003, the subject matter of which is incorporated herein by reference.

FIELD OF THE INVENTION

The present invention relates to creating an image of a radiation source, and more specifically, to a method and a system for creating an image of a radiation source.

BACKGROUND OF THE INVENTION

In medical imaging, such as in Nuclear Medicine, a radioactive material, such as a radioactive tracer, is introduced into an object or a body to view parts of the object or body. The parts of the body that receive the radioactive material act as a radiation source for emitting radiation. A system for creating an image of the radiation source includes a detector for detecting radiation associated with the radiation source. The detector may be a gamma camera, a positron emission tomography (PET) camera, a solid state detector, or an x-ray detector. The spatial resolution and contrast of the image generated by the system is limited by the intrinsic resolution or point spread function of the detector.

SUMMARY OF THE INVENTION

A method of creating an image of a radiation source includes detecting radiation associated with a first location of the radiation source. Data corresponding to the radiation associated with the first location is processed to provide a first value. The first value is employed to generate a first portion of the image associated with the first location. Radiation associated with a second location of the radiation source is detected. Data corresponding to the radiation associated with the second location is processed to provide a second value. The second value is employed to generate a second portion of the image associated with the second location.

In accordance with one feature, a system for creating the image of the radiation source includes an aggregator for aggregating the data corresponding to radiation associated with the first location of the radiation source to provide the first value. The aggregator aggregates the data corresponding to radiation associated with the second location of the radiation source to provide the second value. A mapping system maps the first value to a first portion of the image associated with the first location and maps the second value to a second portion of the image associated with the second location.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF THE INVENTION

Figure 1:
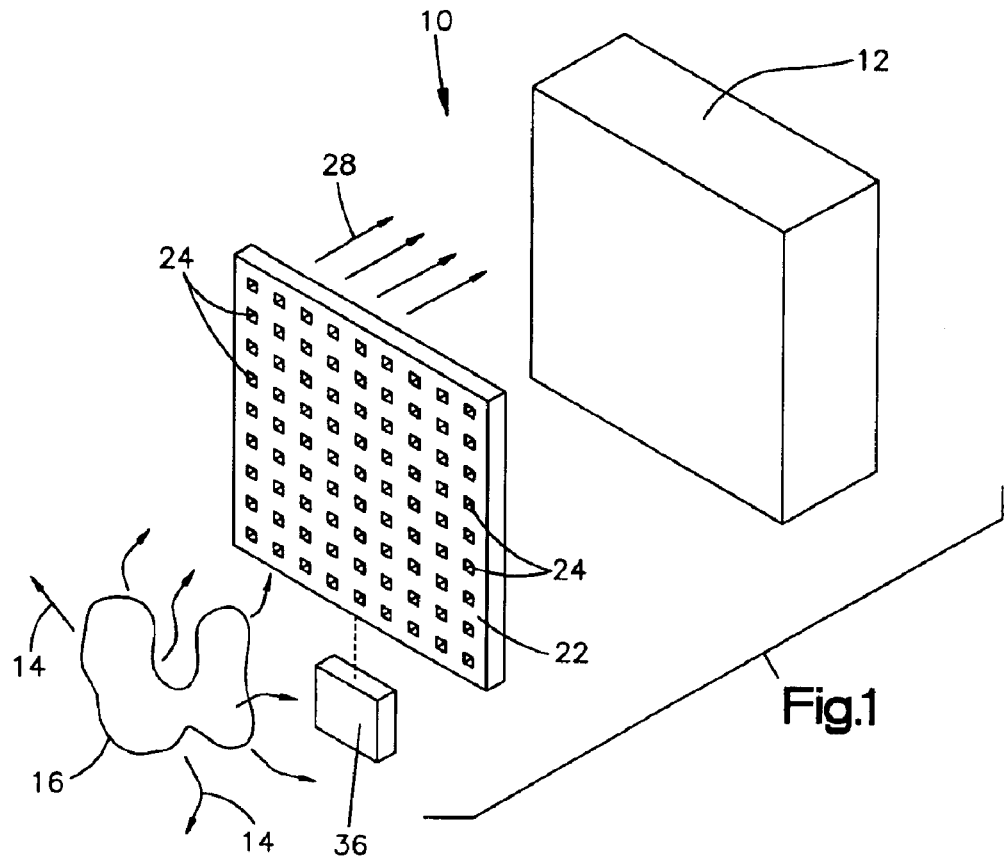
FIG. 1 is a schematic view of a portion of a system for creating an image of a radiation source.
Figure 2:
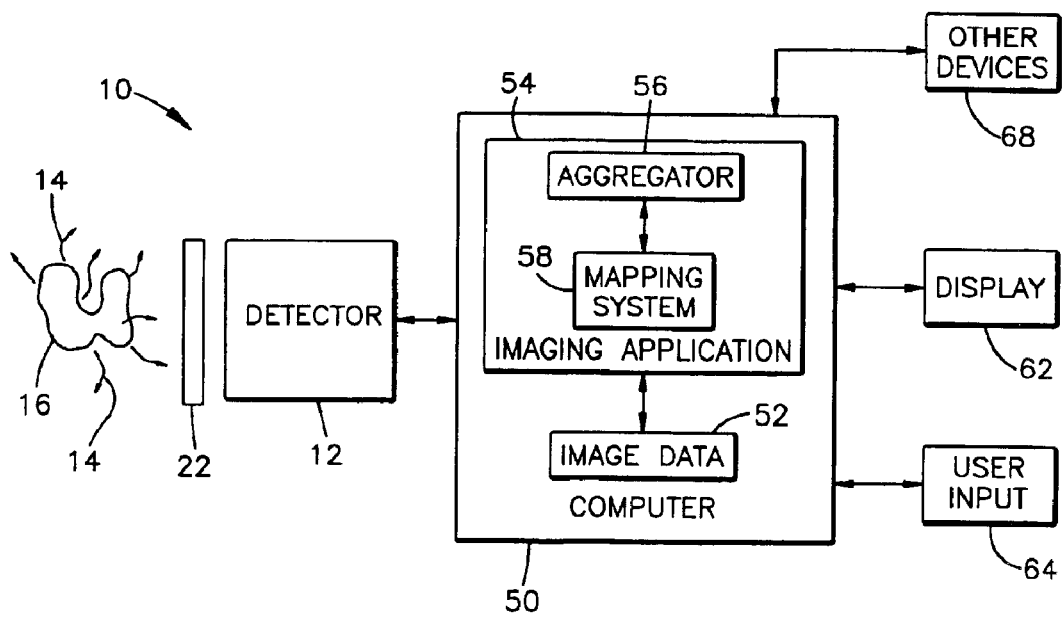
FIG. 2 is a schematic view of the system of FIG. 1.
Figure 3:
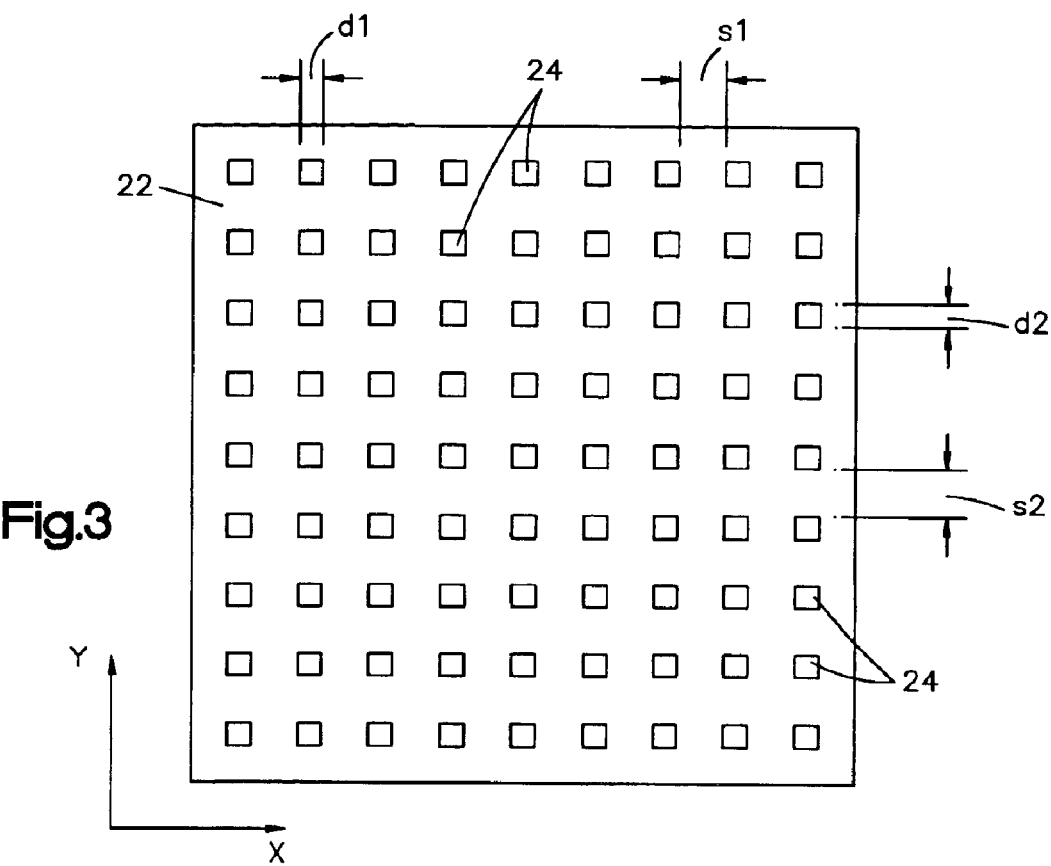
FIG. 3 is a plan view of a first embodiment of a plate member for use in the system of FIG. 2.

The present invention is directed to a method and a system for creating an image of a radiation source. A system for creating an image of a radiation source is illustrated in FIGS. 1–3. The system 10 (FIG. 1) includes a detector 12. The detector 12 detects radiation 14, such as ionizing radiation, emitted from a radiation source 16. The system 10 may be used in medical imaging to create an image of the radiation source 16. The detector 12 may include a collimator, a crystal, photo multipliers, and/or solid state detector elements as known in the art. The detector 12 may be any suitable detector, such as a gamma camera, a positron emission tomography (PET) camera, a solid state detector, or an x-ray detector.

A plate member 22 is located between the detector 12 and the radiation source 16. The plate member 22 is made of a suitable radiation absorbing material, such as lead, and includes a plurality of apertures 24. It is contemplated that the plate member 22 may have any desired thickness. It is also contemplated that the plate member 22 may be used as a collimator for the detector 12. The radiation 14 from the radiation source 16 only passes through the apertures 24 in the plate member 22 to the detector 12. Accordingly, the detector 12 only detects radiation 28 that passes through the apertures 24.

The apertures 24 (FIG. 3) are arranged in the plate member 22 in a predetermined pattern. The apertures 24 are arranged in a series of rows and columns. The plate member 22 may have any desired number of rows and columns of apertures 24. Furthermore, the apertures 24 may be arranged in any desired pattern. It is also contemplated that the plate member 22 may have any desired number of apertures 24.

The apertures 24 (FIG. 3) are identical to each other. Each of the apertures 24 is square shaped. Each of the apertures 24 in the plate member 22 has a first dimension d1 measured in an x direction. Each of the apertures 24 has a second dimension d2 measured in a y direction. The first dimension d1 is equal to the second dimension d2. The dimensions d1 and d2 are smaller than the intrinsic resolution or point spread function of the detector 12. It is contemplated that the apertures 24 may have any desired shape, such as circular, triangular, rectangular or hexagonal. Furthermore, the apertures 24 may not be identical to each other, may vary in size and shape and be arranged in configurations other than a rectangular pattern, if desired.

The apertures 24 are spaced from each other in the x direction by septa of a distance s1. The apertures 24 are spaced from each other in the y direction by septa of a distance s2. The distance s1 is equal to the distance s2. It is contemplated that the distance s1 may not be equal to the distance s2. Each of the distances s1 and s2 is equal to two times the dimension d1. Accordingly, each of the distances s1 and s2 is equal to two times the dimension d2. Each of the distances s1 and s2 is larger than the intrinsic resolution of the detector 12. Accordingly, each of the apertures 24 has a guard band surrounding the aperture. It is contemplated that the distance s1 may be equal to any integer times the dimension d1 and that the distance s2 may be equal to any integer times the dimension d2.

Each of the apertures 24 (FIG. 1) is associated with a location of the radiation source 16. The locations of the radiation source 16 have sizes equal to the sizes of the apertures 24. Radiation 28 associated with each of the locations of the radiation source 16 passes through the apertures 24 to the detector 12 while the plate member 22 prevents passage of radiation from the radiation source 16 at locations not associated with the apertures. The detector 12 detects or samples the radiation 28 associated with each of the locations of the radiation source 16. Accordingly, the detector 12 detects radiation 28 associated with a first location of the radiation source 16 that passes through a first aperture 24 in the plate member 22. The detector 12 also detects radiation 28 associated with a second location of the radiation source 16 that passes through a second aperture 24 that is spaced from the first aperture.

A positioning mechanism 36 is connected with the plate member 22 to move the plate member in the x direction or a first linear direction relative to the detector 12 and the radiation source 16. The positioning mechanism 36 also moves the plate member 22 in the y direction or a second linear direction relative to the detector 12 and the radiation source 16. The positioning mechanism 36 moves the plate member 22 in a stepwise manner relative to the detector 12 and the radiation source 16. It is contemplated that the positioning mechanism 36 may move the plate member 22 in a continuous linear motion in the x direction and a continuous linear motion in the y direction. The positioning mechanism 36 may be any suitable positioning mechanism for moving the plate member 22 relative to the detector 12 and the radiation source 16, such as an electric motor or manually operable mechanism. It is contemplated that any number of positioning mechanisms 36 may be used to move the plate member 22.

The positioning mechanism 36 moves the plate member 22 relative to the detector 12 and the radiation source 16 so that the detector detects radiation associated with every location of the radiation source 16. The positioning mechanism 36 moves the plate member 22 in the x direction in steps having a distance equal to the dimension d1. The positioning mechanism 36 moves the plate member 22 in the y direction in steps having a distance equal to the dimension d2. The positioning mechanism 36 positions the plate member 22 in nine steps in the x and y directions so that the detector 12 detects radiation from every location of the radiation source 16. It is contemplated that the positioning mechanism 36 may move the plate member 22 any suitable number of steps relative to the detector 12 and the radiation source 16. Furthermore, the positioning mechanism 36 may move the plate member 22 in the x direction in steps having a distance equal to a fraction of the dimension d1 and in the y direction in steps having a distance equal to a fraction of the dimension d2. It is also contemplated that the positioning mechanism 36 may rotate the plate member 22 relative to the detector 12 and the radiation source 16.

The detector 12 (FIG. 2) is operably connected with a computer 50. The computer 50 receives image data 52 from the detector 12. An imaging application 54 processes the image data 52 corresponding to the radiation 28 associated with the locations of the radiation source 16 to provide a plurality of image values. The imaging application 54 employs the image values to generate portions of the image associated with the locations of the radiation source 16.

The imaging application 54 includes an aggregator 56 for processing the image data 52. The aggregator 56 aggregates the image data 52 corresponding to the radiation associated with the locations of the radiation source 16 to provide the image values. A mapping system 58 of the imaging application 54 maps the image values to corresponding portions of the image.

The computer 50 is operably connected to a display 62 for displaying the image. An apparatus 64 is operably connected to the computer 50 for inputting user input, such as the locations and sizes of the apertures 24 in the plate member 22. Other devices 68 may also be operably connected to the computer 50, such as a printer, a computer network, and/or the internet. It is also contemplated that the positioning mechanism 36 may be operably connected to the computer 50. The computer 50 may operate the positioning mechanism 36 to move the plate member 22 relative to the detector 12 and the radiation source 16.

The system 10 (FIGS. 1 and 2) operates to create an image of the radiation source 16 by positioning the plate member 22 in a first position relative to the detector 12 and the radiation source 16. The detector 12 detects or samples radiation 28 from the radiation source 16 passing through the apertures 24 in the plate member 22. The detector 12 detects radiation 28 associated with a first set of locations of the radiation source 16. The radiation 28 that passes through the apertures 24 in the plate member 22 is detected by the detector 12. The detector 12 produces Gaussian-like distributions or events of image data 52. The distributions of image data 52 are generally spread over an area that is greater than the area of the apertures 24. The distributions of data do not overlap since the apertures 24 are spaced apart with guard bands by distances s1 and s2 that are larger than the intrinsic resolution or point spread function of the detector 12. It is contemplated that the distances s1 and s2 may be chosen such that the distributions may overlap. Accordingly, the detector 12 detects radiation 28 associated with a first location of the radiation source 16 that passes through a first one of the apertures 24. The detector 12 also detects radiation 28 associated with a second location of the radiation source 16 that passes through a second one of the apertures 24.

The image data 52 associated with the first set of locations is processed by the imaging application 54. The image data 52 corresponding to the radiation 28 associated with the first set of locations of the radiation source 16 is processed by the aggregator 56 to provide a first set of image values. Accordingly, the aggregator 56 aggregates the image data 52 corresponding to the radiation 28 associated with the first location of the radiation source 16 to produce a first image value. The aggregator 56 aggregates the image data 52 corresponding to the radiation 28 associated with the second location to produce a second image value. The aggregator 56 may sum up the values of each of the distributions to provide each of the image values. Accordingly, the statistical noise associated with each of the image values is minimal. If the distributions of image data 52 overlap, the imaging application 54 may correct the image values using experimentally determined or estimated contributions from the adjacent distributions. A sample image of the radiation source 16 may be generated.

After the detector 12 detects the radiation 28 associated with the first set of locations of the radiation source 16 with the plate member 22 in the first position, the positioning mechanism 36 moves the plate member in the x direction a distance equal to the dimension d1 into a second position. The detector 12 detects radiation 28 from the radiation source 16 passing through the apertures 24 in the plate member 22. The detector 12 detects radiation 28 associated with a second set of locations of the radiation source 16. The radiation 28 that passes through the apertures 24 in the plate member 22 is detected by the detector 12. The detector 12 produces distributions of image data 52. Accordingly, the detector 12 detects radiation associated with a third location of the radiation source 16 that passes through the first one of the apertures 24. The detector 12 also detects radiation 28 associated with a fourth location of the radiation source 16 that passes through the second one of the apertures 24.

The image data 52 associated with the second set of locations is processed by the imaging application 54. The image data 52 corresponding to the radiation 28 associated with the second set of locations of the radiation source 16 is processed by the aggregator 56 to provide a second set of image values. Accordingly, the aggregator 56 aggregates the image data 52 corresponding to the radiation 28 associated with the third location of the radiation source 16 to produce a third image value. The aggregator 56 aggregates the image data 52 corresponding to the radiation 28 associated with the fourth location to produce a fourth image value. A second sample image of the radiation source 16 may be generated.

After the detector 12 detects the radiation 28 associated with the second set of locations of the radiation source 16 with the plate member 22 in the second position, the positioning mechanism 36 moves the plate member in the y direction a distance equal to the dimension d2 into a third position. The detector 12 detects radiation 28 from the radiation source 16 passing through the apertures 24 in the plate member 22. The detector 12 detects radiation 28 associated with a third set of locations of the radiation source 16. The radiation 28 that passes through the apertures 24 in the plate member 22 is detected by the detector 12. The detector 12 produces distributions of image data 52. Accordingly, the detector 12 detects radiation associated with a fifth location of the radiation source 16 that passes through the first one of the apertures 24. The detector 12 also detects radiation 28 associated with a sixth location of the radiation source 16 that passes through the second one of the apertures 24.

The image data 52 associated with the third set of locations is processed by the imaging application 54. The image data 52 corresponding to the radiation 28 associated with the third set of locations of the radiation source 16 is processed by the aggregator 56 to provide a third set of image values. Accordingly, the aggregator 56 aggregates the image data 52 corresponding to the radiation 28 associated with the fifth location of the radiation source 16 to produce a fifth image value. The aggregator 56 aggregates the image data 52 corresponding to the radiation 28 associated with the sixth location to produce a sixth image value. A third sample image of the radiation source 16 may be generated.

The steps of moving the plate member 22, detecting radiation 28 associated with a set of locations, and processing the image data 52 associated with the set of locations is repeated until radiation associated with every location of the radiation source 16 is detected. The steps need to be repeated at least nine times to detect radiation 28 from every location of the radiation source 16. The number of steps that are needed to detect radiation emitted from every location of the radiation source 16 is a function of the size of the apertures 24 in the plate member 22 and the distances s1 and s2 between the apertures. It is contemplated that any number of steps could be used to detect radiation emitted from every location of the radiation source.

The mapping system 58 employs the image values to generate the image of the radiation source 16. The mapping system 58 maps the image values to portions or pixels of the image that correspond to the locations of the radiation source 16. Each of the portions of the image has an area that is equal to the area of the aperture 24 in the plate member 22. The image values in each of the portions of the image do not contain data associated with any other locations of the radiation source 16. Accordingly, the spatial resolution of the system 10 is equal to the size of the apertures 24 in the plate member 22 and is independent of the spatial resolution or point spread function of the detector 12.

The mapping system 58 maps the first image value to a first portion of the image that corresponds to the first location of the radiation source 16. The first portion of the image has an area that is equal to the area of the aperture 24 in the plate member 22. The image value in the first portion of the image does not contain any data associated with any other locations of the radiation source 16. The mapping system 58 maps the second image value to a second portion of the image that corresponds to the second location of the radiation source 16. The second portion of the image has an area that is equal to the area of the aperture 24 in the plate member 22. The image value in the second portion of the image does not contain any data associated with any other locations of the radiation source 16. The mapping system 58 maps all the image values to corresponding portions of the image. Accordingly, the image has a resolution equal to the size of the apertures 24 in the plate member 22, which may be smaller than the intrinsic resolution of the detector 12. The image also has an improved contrast since each of the portions of the image does not include data associated with any other locations of the radiation source 16. It is contemplated that each of the portions of the image may include a minimal amount of data associated with another location of the radiation source 16. It is contemplated that if the distributions of image data 52 overlap, the imaging application 54 may correct the image values using experimentally determined or estimated contributions from the adjacent distributions.

Figure 4:
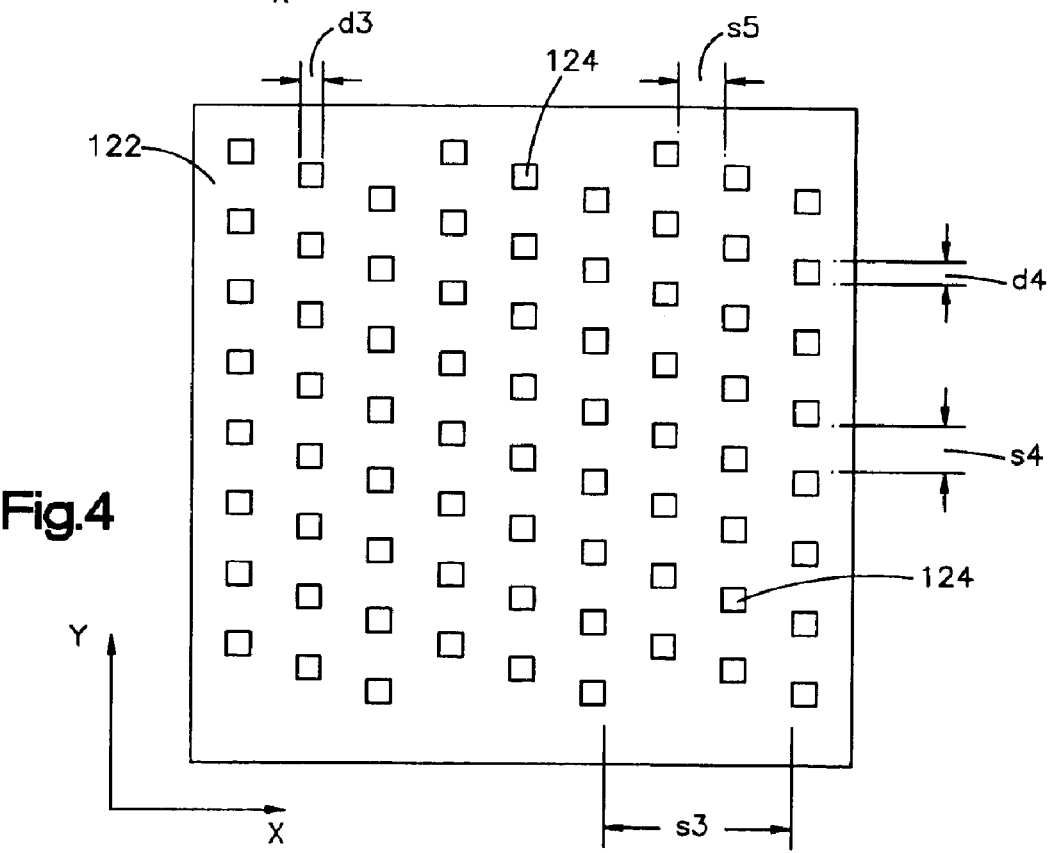
FIG. 4 is a plan view of a second embodiment of a plate member for use in the system in FIG. 2.

A plate member 122 constructed in accordance with a second embodiment for use in the system shown in FIGS. 1–2 is illustrated in FIG. 4. The plate member 122 shown in FIG. 4 is made of a suitable radiation absorbing material, such as lead, and includes a plurality of apertures 124. It is contemplated that the plate member 122 may have any desired thickness. It is also contemplated that the plate member 122 may be used as a collimator for the detector 12. The detector 12 only detects radiation 28 that passes through the apertures 124.

The apertures 124 are arranged in the plate member 122 in a predetermined pattern. The apertures 124 are arranged in a series of rows and columns. The plate member 122 may have any desired number of rows and columns of apertures 124. Furthermore, the apertures 124 may be arranged in any desired pattern. It is also contemplated that the plate member 122 may have any desired number of apertures 124.

The apertures 124 are identical to each other. Each of the apertures 124 is square shaped. Each of the apertures 124 in the plate member 122 has a first dimension d3 measured in an x direction. Each of the apertures 124 has a second dimension d4 measured in a y direction. The first dimension d3 is equal to the second dimension d4. The dimensions d3 and d4 are smaller than the intrinsic resolution or point spread function of the detector 12. It is contemplated that the apertures 124 may have any desired shape, such as circular, triangular, rectangular or hexagonal. Furthermore, the apertures 124 may not be identical to each other and may vary in size and shape if desired The apertures 124 are spaced from each other in the x direction by septa of a distance s3. The apertures 124 are spaced from each other in the y direction by septa of a distance s4. An aperture 124 in one row is not spaced in the y direction from the apertures in the adjacent rows. Adjacent columns are spaced from each other in the x direction by a distance s5 that is equal to the distance s4. The distance s3 is equal to eight times the dimension d3. The distance s4 is equal to two times the dimension d4. The distance s5 is equal to two times the dimension d3. The distances s3, s4, and s5 are larger than the intrinsic resolution of the detector 12. Accordingly, each of the apertures 124 has a guard band surrounding the aperture. It is contemplated that the distance s3 may be equal to any integer times the dimension d3. It is contemplated that the distance s4 may be equal to any integer times the dimension d4 and that the distance s5 may be equal to any integer times the dimension d3.

Each of the apertures 124 is associated with a location of the radiation source 16. The locations of the radiation source 16 have sizes equal to the sizes of the apertures 124. The radiation 28 associated with each of the locations of the radiation source 16 passes through the apertures 124 to the detector 12 while the plate member 122 prevents passage of radiation from the radiation source at locations not associated with the apertures. The detector 12 detects or samples the radiation 28 associated with each of the locations of the radiation source 16. Accordingly, the detector 12 detects radiation 28 associated with a first location of the radiation source 16 that passes through a first aperture 124 in the plate member 122. The detector 12 also detects radiation 28 associated with a second location of the radiation source 16 that passes through a second aperture 124 that is spaced from the first aperture.

The positioning mechanism 36 is connected with the plate member 122 to move the plate member in the x direction or a first linear direction relative to the detector 12 and the radiation source 16. The positioning mechanism 36 moves the plate member 122 in a stepwise manner relative to the detector 12 and the radiation source 16. It is contemplated that the positioning mechanism may move the plate member 122 in a continuous linear motion in the x direction.

The positioning mechanism 36 moves the plate member 122 relative to the detector 12 and the radiation source 16 so that the detector detects radiation associated with every location of the radiation source 16. The positioning mechanism 36 moves the plate member 122 in the x direction in steps having a distance equal to the dimension d3. The positioning mechanism 36 positions the plate member 122 in nine steps in the x direction so that the detector 12 detects radiation from every location of the radiation source 16. It is contemplated that the positioning mechanism 36 may move the plate member 122 any suitable number of steps relative to the detector 12 and the radiation source 16. Furthermore, the positioning mechanism 36 may move the plate member 122 in steps having a distance equal to a fraction of the dimension d3. Accordingly, the positioning mechanism 36 only moves the plate member 122 in one linear direction so that the detector 12 detects radiation 28 from every location of the radiation source 16.

Figure 5:
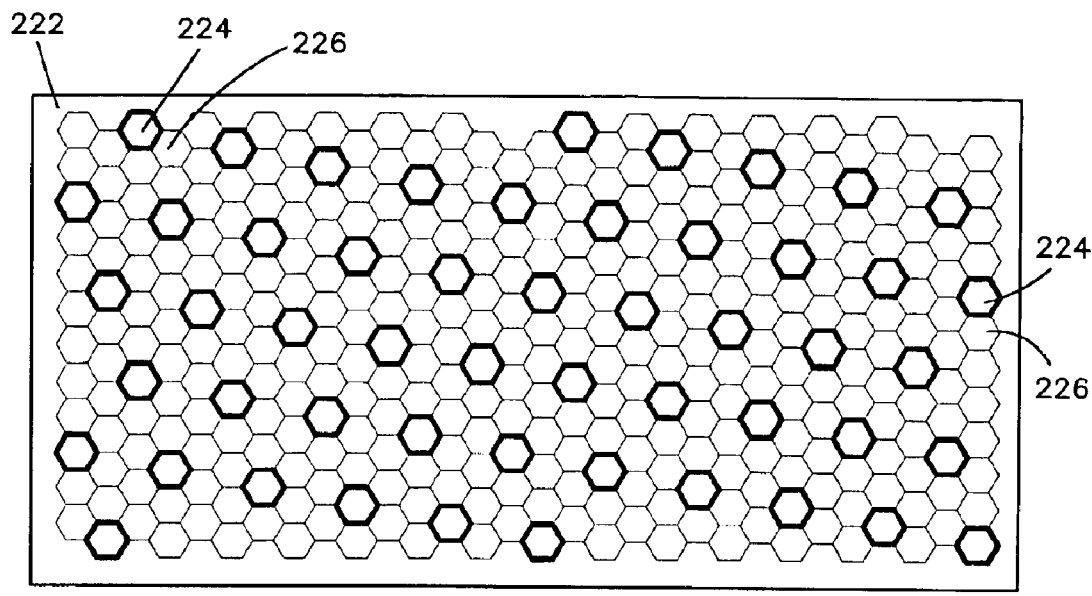
FIG. 5 is a plan view of a third embodiment of a plate member for use in the system in FIG. 2.

A plate member 222 constructed in accordance with a third embodiment for use in the system shown in FIGS. 1–2 is illustrated in FIG. 5. The plate member 222 shown in FIG. 5 is made of a suitable radiation absorbing material, such as lead, and includes a plurality of apertures 224. It is contemplated that the plate member 222 may have any desired thickness. It is also contemplated that the plate member 222 may be used as a collimator for the detector 12. The detector 12 only detects radiation 28 that passes through the apertures 224. The apertures 224 are arranged in the plate member 222 in a predetermined pattern. The apertures 224 are arranged in a honeycomb pattern. The apertures 224 may be arranged in any desired pattern. It is contemplated that the plate member 222 may have any desired number of apertures 224.

The apertures 224 are identical to each other. Each of the apertures 224 is hexagonal shaped. Each of the apertures 224 has a size smaller than the intrinsic resolution of the detector 12. The apertures 224 are spaced from each other so that each aperture has a hexagonal space 226 equal in size to the aperture to each s1de of the aperture that does not overlap a hexagonal space to a s1de of another aperture. The distances between the apertures 224 are larger than the intrinsic resolution of the detector 12. Accordingly, each of the apertures 224 has a guard band surrounding the aperture. It is contemplated that the apertures 224 may have any desired shape, such as circular, triangular, rectangular or square shaped. Furthermore, the apertures 224 may not be identical to each other and may vary in size and shape if desired.

Each of the apertures 224 is associated with a location of the radiation source 16. The locations of the radiation source 16 have sizes equal to the sizes of the apertures 224. The radiation 28 associated with each of the locations of the radiation source 16 passes through the apertures 224 to the detector 12 while the plate member 222 prevents passage of radiation from the radiation source at locations not associated with the apertures. The detector 12 detects or samples the radiation 28 associated with each of the locations of the radiation source 16. Accordingly, the detector 12 detects radiation 28 associated with a first location of the radiation source 16 that passes through a first aperture 224 in the plate member 222. The detector 12 also detects radiation 28 associated with a second location of the radiation source 16 that passes through a second aperture 224 that is spaced from the first aperture.

The positioning mechanism 36 is connected with the plate member 222 to move the plate member relative to the detector 12 and the radiation source 16. The positioning mechanism 36 moves the plate member 222 in a stepwise manner relative to the detector 12 and the radiation source 16. It is contemplated that the positioning mechanism 36 may move the plate member 222 in a continuous motion.

The positioning mechanism 36 moves the plate member 222 relative to the detector 12 and the radiation source 16 so that the detector detects radiation associated with every location of the radiation source 16. The positioning mechanism 36 moves the plate member 222 in steps having a distance equal to the size of the apertures 224. The positioning mechanism 36 positions the plate member 222 in at least seven steps so that the detector 12 detects radiation from every location of the radiation source 16. It is contemplated that the positioning mechanism 36 may move the plate member 222 any suitable number of steps relative to the detector 12 and the radiation source 16. Furthermore, the positioning mechanism 36 may move the plate member 222 in steps having a distance equal to a fraction of the size of the apertures 224. The positioning mechanism 36 may move the plate member 222 in one linear direction extending perpendicular to sides of the apertures 224 so that the detector 12 detects radiation from every location of the radiation source 16. The positioning mechanism 36 may move the plate member 222 in a circular pattern so that the detector 12 detects radiation from every location of the radiation source 16.

Figure 6:
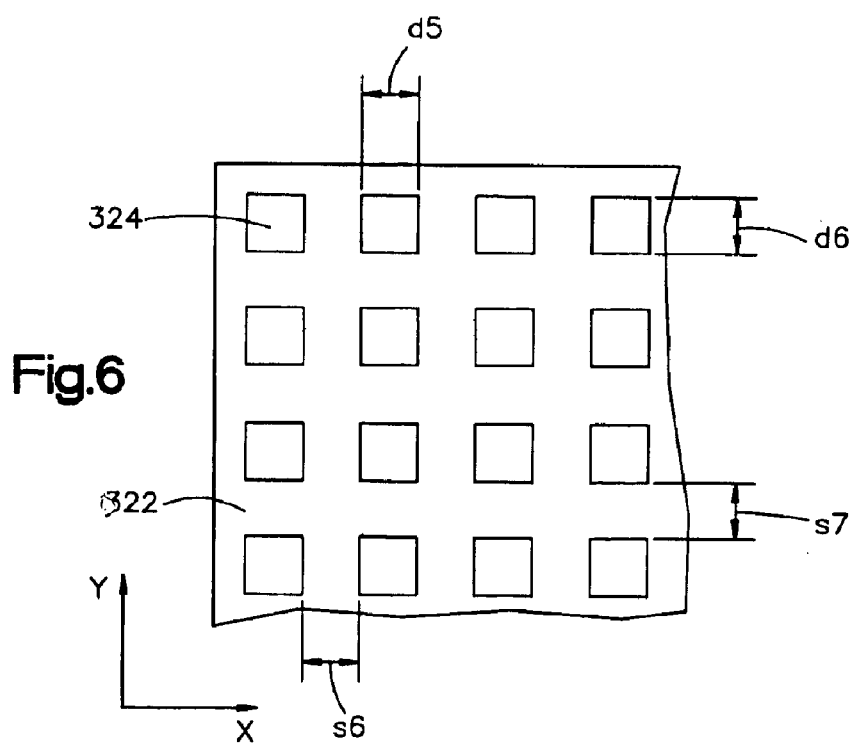
FIG. 6 is a plan view of a portion of a fourth embodiment of a plate member for use in the system in FIG. 2.

A portion of a plate member 322 constructed in accordance with a fourth embodiment for use in the system shown in FIGS. 1–2 is illustrated in FIG. 6. The plate member 322 shown in FIG. 6 is made of a suitable radiation absorbing material, such as lead, and includes a plurality of apertures 324. It is contemplated that the plate member 322 may have any desired thickness. It is also contemplated that the plate member 322 may be used as a collimator for the detector 12. The detector 12 only detects radiation 28 that passes through the apertures 324.

The apertures 324 are arranged in the plate member 322 in a predetermined pattern. The apertures 324 are arranged in a series of rows and columns. The plate member 322 may have any desired number of rows and columns of apertures 324. Furthermore, the apertures 324 may be arranged in any desired pattern. It is also contemplated that the plate member 322 may have any desired number of apertures 324.

The apertures 324 are identical to each other. Each of the apertures 324 is square shaped. Each of the apertures 324 in the plate member 322 has a first dimension d5 measured in an x direction. Each of the apertures 324 has a second dimension d6 measured in a y direction. The first dimension d5 is equal to the second dimension d6. The dimensions d5 and d6 are smaller than the intrinsic resolution or point spread function of the detector 12. It is contemplated that the apertures 324 may have any desired shape, such as circular, triangular, rectangular or hexagonal. Furthermore, the apertures 324 may not be identical to each other and may vary in size and shape if desired.

The apertures 324 are spaced from each other in the x direction by septa of a distance s6. The apertures 324 are spaced from each other in the y direction by septa of a distance s7. The distances s6 and s7 are equal to each other and the dimensions d5 and d6. Accordingly, each of the apertures 324 has a guard band surrounding the aperture.

Each of the apertures 324 is associated with a location of the radiation source 16. The locations of the radiation source 16 have sizes equal to the sizes of the apertures 324. The radiation 28 associated with each of the locations of the radiation source 16 passes through the apertures 324 to the detector 12 while the plate member 322 prevents passage of radiation from the radiation source at locations not associated with the apertures. The detector 12 detects or samples the radiation 28 associated with each of the locations of the radiation source 16. Accordingly, the detector 12 detects radiation 28 associated with a first location of the radiation source 16 that passes through a first aperture 324 in the plate member 322. The detector 12 also detects radiation 28 associated with a second location of the radiation source 16 that passes through a second aperture 324 that is spaced from the first aperture.

The positioning mechanism 36 is connected with the plate member 322 to move the plate member in the x direction or a first linear direction relative to the detector 12 and the radiation source 16. The positioning mechanism 36 also moves the plate member 322 in the y direction relative to the detector 12 and the radiation source 16. The positioning mechanism 36 moves the plate member 322 in a stepwise manner relative to the detector 12 and the radiation source 16. It is contemplated that the positioning mechanism 36 may move the plate member 322 in a continuous motion.

The positioning mechanism 36 moves the plate member 322 relative to the detector 12 and the radiation source 16 so that the detector detects radiation associated with every location of the radiation source 16. The positioning mechanism 36 moves the plate member 322 in the x direction in steps having a distance equal to the dimension d5. The positioning mechanism 36 moves the plate member 322 in the y direction in steps having a distance equal to the dimension d6. The positioning mechanism 36 positions the plate member 322 in four steps in the x and y directions so that the detector 12 detects radiation from every location of the radiation source 16. It is contemplated that the positioning mechanism 36 may move the plate member 322 any suitable number of steps relative to the detector 12 and the radiation source 16. Furthermore, the positioning mechanism 36 may move the plate member 322 in the x direction in steps having a distance equal to a fraction of the dimension d5 and in the y direction in steps having a distance equal to a fraction of the dimension d6.

The plate member 322 is ideally suited for use with a solid state detector, such as a cadmium zinc telluride detector. The solid state detector has an array of detector elements that are generally square in cross-section. The apertures 324 in the plate 322 have a size equal to one quarter the size of the detector elements. It is contemplated that the apertures 324 may be any desired fractional size of the detector elements. The apertures 324 are positioned to expose only one quadrant of the detector elements at a time. The plate member 322 is subsequently positioned to expose different quadrants of the detector elements until the detector detects radiation from every location of the radiation source 16.

The size of the apertures 24, 124, 224, and 324 in the plate members 22, 122, 222, and 322 determine the spatial resolution of the system 10. The smaller the apertures 24, 124, 224, and 324 the better the spatial resolution. Accordingly, the spatial resolution or point spread function of the detector 12 does not determine the spatial resolution of the system 10. The distances between the apertures 24, 124, 224, and 324 determine the contrast of the system 10. The larger the distances between the apertures 24, 124, 224, and 324 the better the contrast. If the apertures 24, 124, 224, and 324 are relatively small and the distances between the apertures are relatively large, a greater number of steps are needed to detect radiation 28 from every location of the radiation source 16.

Each image value provided by the aggregator 56 of the system 10 has a statistical noise. The statistical noise associated with each image value is defined as the inverse of the square root of the image value. The image values provided by the aggregator 56 are generated by summing the values of each of the distributions. Therefore, the image values provided by the aggregator 56 are larger than or equal to image values obtained by not summing the values of the distributions. Accordingly, the image generated by using the image values provided by the aggregator 56 of the system 10 has less statistical noise.

Although the plate members 22, 122, 222, and 322 are described as being located between the radiation source 16 and the detector 12, it is contemplated that the plate members may be used instead of the collimator of the detector.

Although the positioning mechanism 36 moves the plate members 22, 122, 222, and 322 relative to the radiation source 16 and the detector 12 so that the detector detects radiation 28 associated with every location of the radiation source, it is contemplated that the positioning mechanism may move the plate members such that the detector does not detect radiation associated with every location of the radiation source. The imaging application 54 may estimate the image values that correspond to the locations of the radiation source 16 that are not detected. The mapping system 58 may map the estimated image values to corresponding portions of the image.

It is contemplated that the plate members 22, 122, 222, and 322 may be fixed to the detector 12, such as a rotating SPECT (single photon emission computer tomography) camera. A positioning mechanism may rotate the detector 12 and the plate member fixed to the detector relative to the radiation source 16 about an axis extending parallel to the plate member. The detector 12 and the plate member fixed to the detector may be rotated in a continuous or stepwise manner around the radiation source 16. The rotation of the detector 12 and the plate member fixed to the detector permits the detection of radiation 28 from every location of the radiation source 16 from multiple angles around the axis of rotation of the detector. The computer 50, using various mathematical techniques, may construct transaxial cross sections through the radiation source 16.

From the above description of the invention, those skilled in the art will perceive improvements, changes and modifications. Such improvements, changes and modifications within the skill of the art are intended to be covered by the appended claims.

What is claimed is:

1. A method of creating an image of a radiation source comprising:
   detecting radiation associated with a first location of the radiation source;
   processing data corresponding to the radiation associated with only the first location to provide a first value;
   employing the first value to generate a first portion of the image associated with the first location;
   detecting radiation associated with a second location of the radiation source;
   processing data corresponding to the radiation associated with only the second location to provide a second value; and
   employing the second value to generate a second portion of the image associated with the second location.

2. A method as set forth in claim 1 further including detecting radiation associated with a first location of the radiation source having a size that is smaller than the resolution of a detector used for detecting the radiation and detecting radiation associated with a second location of the radiation source having a size that is smaller than the resolution of the detector.

3. A method as set forth in claim 1 further including providing a member for preventing radiation of the radiation source from being detected between the radiation source and a detector for detecting radiation having an aperture through which radiation associated with the first and second locations passes.

4. A method as set forth in claim 3 further including detecting radiation associated with a first location located substantially adjacent to a second location while preventing detection of radiation associated with the second location and detecting radiation associated with the second location while preventing detection of radiation associated with the first location.

5. A method as set forth in claim 3 further including placing the member in a first position relative to the detector while detecting radiation associated with the first location and placing the member in a second position relative to the detector while detecting radiation associated with the second location.

6. A method as set forth in claim 5 further including moving the member and the detector relative to each other in only one linear direction from the first position to the second position.

7. A method as set forth in claim 3 further including placing the member in a first position relative to the radiation source while detecting radiation associated with the first location and placing the member in a second position relative to the radiation source while detecting radiation associated with the second location.

8. A method as set forth in claim 3 further including providing the aperture in the member with a size smaller than the resolution of the detector.

9. A method as set forth in claim 1 further including providing a member for preventing radiation associated with a third location of the radiation source from being detected between the radiation source and a detector for detecting radiation having first and second apertures spaced from each other through which radiation associated with the first and second locations passes.

10. A method as set forth in claim 9 further including simultaneously detecting radiation associated with the first and second locations.

11. A method as set forth in claim 1 further including summing values of a distribution of data corresponding to the radiation associated with only the first location to provide the first value.

12. A method as set forth in claim 11 further including summing values of a distribution of data corresponding to the radiation associated with only the second location to provide the second value.

13. A system for creating an image of a radiation source comprising:
   an aggregator for aggregating data corresponding to radiation associated with only a first location of the radiation source to provide a first value, said aggregator aggregating data corresponding to radiation associated with only a second location of the radiation source to provide a second value;
   a mapping system for mapping the first value to a first portion of the image associated with the first location and for mapping the second value to a second portion of the image associated with the second location.

14. A system as set forth in claim 13 further including a detector for detecting the radiation associated with the first and second locations.

15. A system as set forth in claim 14 further including a member for preventing radiation of the radiation source from being detected between the radiation source and the detector having an aperture through which radiation associated with the first and second locations passes.

16. A system as set forth in claim 15 wherein said aperture has a size smaller than the resolution of the detector.

17. A system as set forth in claim 15 further including means for moving the member and the detector relative to each other.

18. A system as set forth in claim 15 further including means for moving the member and the radiation source relative to each other.

19. A system as set forth in claim 14 further including a member for preventing radiation associated with a third location of the radiation source from being detected between the radiation source and the detector having first and second apertures spaced from each other through which radiation associated with the first and second locations passes.

20. A system as set forth in claim 19 wherein each of said first and second apertures has a size smaller than the resolution of the detector.

21. A system as set forth in claim 19 further including means for moving the member and the detector relative to each other.

22. A system as set forth in claim 19 further including means for moving the member and the radiation source relative to each other.

* * * * *